US006385470B1

(12) United States Patent
Bendixen

(10) Patent No.: US 6,385,470 B1
(45) Date of Patent: May 7, 2002

(54) METHOD AND DEVICE FOR CONTROLLING THE POWER CONSUMPTION OF A MOBILE RADIO DEVICE

(75) Inventor: Carsten Bendixen, Aalborg SO (DK)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/388,670

(22) Filed: Sep. 2, 1999

(30) Foreign Application Priority Data

Oct. 27, 1998 (DE) .......................................... 98 120 284

(51) Int. Cl.[7] ................................................. H04B 1/40
(52) U.S. Cl. ........................................ 455/574; 455/343
(58) Field of Search ................................. 455/343, 571, 455/572, 574; 340/7.32–7.37

(56) References Cited

U.S. PATENT DOCUMENTS

| 4,688,159 A | 8/1987 | Marinus |
| 5,274,369 A | 12/1993 | Tsunoda et al. |
| 6,263,192 B1 * | 7/2001 | Alderton ...................... 455/73 |

FOREIGN PATENT DOCUMENTS

| DE | 195 45 659 A1 | 6/1997 |
| GB | 2 284 085 A | 5/1995 |

* cited by examiner

Primary Examiner—Lee Nguyen
(74) Attorney, Agent, or Firm—Michael J. Striker

(57) ABSTRACT

A method for controlling the power consumption of a mobile radio device, in particular a mobile phone, having a pulse width modulation DC/DC-converter for converting the battery (B) supply voltage ($V_i$) to an internal supply voltage ($V_o$) for an internal electrical circuit (10) of the mobile radio device includes the step of providing at least one switchable component (O, K, E, VR) for the pulse width modulation DC/DC-converter, where the switchable component (O, K, E, VR) has at least two switching states. The first switching state corresponds to a first output power requirement and the second switching state corresponds to a second output power requirement of the internal electrical circuit (10). The method also includes the step of deriving an internal logical control signal (CNT), which reflects a first output power requirement operation period or a second output power requirement operation period of the internal electrical circuit (10). The step of switching the switchable component (O, K, E, VR) in accordance with the derived internal logical control signal (CNT) is also included in the method.

12 Claims, 4 Drawing Sheets

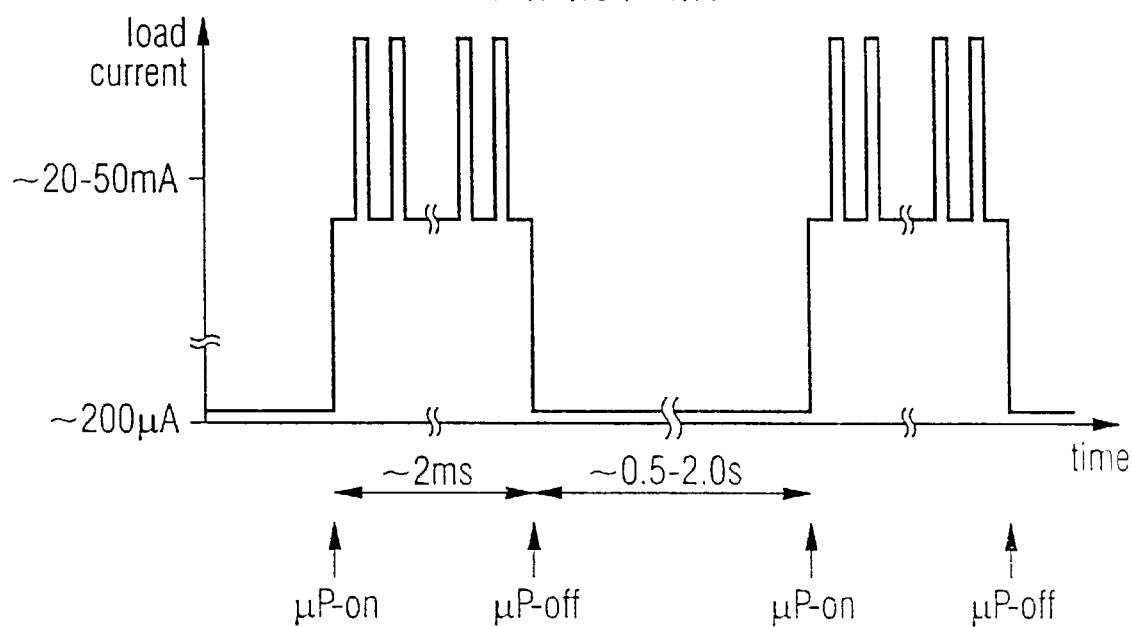
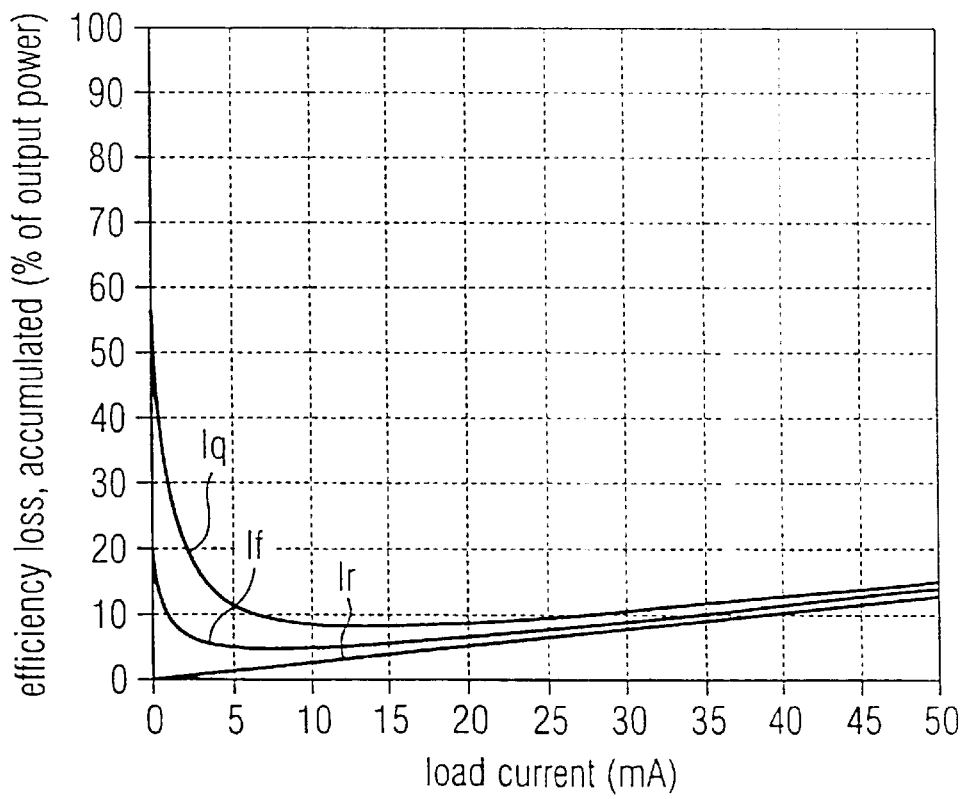

METHOD AND DEVICE FOR CONTROLLING THE POWER CONSUMPTION OF A MOBILE RADIO DEVICE

BACKGROUND OF THE INVENTION

The present invention relates to a method and device for controlling the power consumption of a mobile radio device, and in particular a mobile phone, having a pulse width modulation DC/DC-converter for converting a battery supply voltage to an internal supply voltage for an internal electrical circuit of said mobile radio device.

Although applicable to any mobile radio devices, the present invention and its underlying problems will be discussed with particular reference to GSM mobile systems.

In present generations of mobile phones, DC/DC-converters are often used to generate an internal supply voltage for an associated internal electrical circuit, such as a digital part formed as an integrated circuit, in order to achieve the lowest possible current consumption, thus keeping the battery operation time as long as possible. This is especially beneficial, if the internal supply voltage is low compared to the battery supply voltage, i.e. in case of a DC/DC-downconverter.

FIG. 4 shows a simplified block diagram of a usual mobile phone having a pulse width modulation DC/DC-converter for converting a battery supply voltage to an internal supply voltage of a baseband digital part.

In FIG. 4 reference sign B denotes a battery, R1 a first voltage regulator, R2 a second voltage regulator, R3 a third voltage regulator, 10 a baseband digital part, 20 a baseband analog part, 30 a radio frequency part, 40 a transmitter, 50 an antenna, 60 a loudspeaker, and 70 a microphone.

The first voltage regulator R1 is pulse width modulation DC/DC-downconverter for downconverting a battery supply voltage to an internal supply voltage of the baseband digital part 10 which part is usually supplied with the lowest voltage present in the phone.

The second voltage regulator R2 for the baseband analog part 20 and the third voltage regulator R3 for the radio frequency 30 are linear regulators because of the low noise requirements of the analog circuits in the baseband analog part 20 and the radio frequency part 30, respectively.

The technical problem associated with the concept of the mobile phone shown in FIG. 4 is the large dynamic range of the load current for the baseband digital part 10 to be supplied by the first voltage regulator R1 in form of said pulse width modulation DC/DC-downconverter.

A typical situation is indicated in FIG. 5 which shows the load current of the baseband digital part 10 as a function of time for a GSM mobile phone in the standby state (a similar profile may be found in other mobile phone systems).

From FIG. 5 it can be seen that the power is drawn in very short load bursts of approximately 2 ms, typically spaced 0.5–2 s apart. The start of the bursts $\mu$P-on corresponds to the microprocessor starting its activity associated with the sychronization of the network and paging procedures which lead to a current consumption of the order of 20–50 mA. Once the microprocessor stops its activity, the digital baseband part 10 goes to sleep mode and the current drops very low to a value of the order of 200 $\mu$A as only a simple counter is running at a 32,768 kHz oscillator for counting up to the time of the next activity period.

With the demand of decreasing size of the mobile phones, also the components L and C of the pulse width modulation DC/DC-converter should be made physically minimized, i.e. their capacitance and inductance values be made lower. However, decreased capacitance and inductance values require an increased switching frequency in order to keep the output power constant.

On the other hand, a high switching frequency results in higher losses in the DC/DC-converter, leading to a lower power efficiency, especially at low loads.

FIG. 6 shows the efficiency loss of a typical DC/DC-converter as a function of the load current between 0 and 50 mA, and FIG. 7 as a function of the load current between 1 and 5 mA.

In FIGS. 6 and 7, $l_q$ denotes the quiescent current losses mainly originating from and being proportional to the bias currents of the comparator and error amplifier, $l_f$ the switching losses being proportional to the frequency, and $l_r$ the $I^2R$ losses for a parasitic output resistance R.

As becomes readily apparent from FIGS. 6 and 7, the quiescent current losses $l_q$ and the switching losses $l_f$ dominate at low output currents, i.e. in the sleep mode, while the $I^2R$ losses $l_r$ become comparable at high output currents, i.e. in the activity mode.

Today, various schemes are used to overcome this problem. Some of the most popular are often referred to as PFM (pulse frequency modulation), fixed on-time or fixed off-time. According to these schemes, the switching frequency is changed according to the load. This is achieved either by measuring the output current and adjusting the switching frequency accordingly (PFM), or by using a comparator which measures the output voltage to control the switch.

Both methods require increased circuit complexity compared to a fixed frequency PWM converter and both have decreased load regulation performance at low switching frequencies. The comparator controlled type furthermore involves a larger output ripple inherent to the nature of this control scheme.

SUMMARY OF THE INVENTION

The present invention provides a method and device for controlling the power consumption of a mobile radio device, and in particular a mobile phone, having a pulse width modulation DC/DC-converter for converting a battery supply voltage to an internal supply voltage, as defined in independent claims 1 and 6, respectively.

The principal idea underlying the present invention is to use information available in the mobile radio device to change the operating mode of the DC/DC-converter in order to save power, thus improving the operation time of the device. The changeover of the operating mode from sleep mode to an active mode is controlled by an internal logical control signal. It is this control signal which according to the invention is also used to switch the DC/DC-converter from a low power requirement mode having a low PWM frequency to a high power requirement mode having a high PWM frequency, namely not as a reaction of a changing load current, but anticipating a changing load current.

A particular advantage is that the load regulation problem described above is eliminated. Furthermore, the circuit complexity is low, because existing information is used, thus preventing the need for load current sensing circuitry.

The mobile radio device, i.e. the mobile phone, has increased performance due to the fact that the efficiency of the DC/DC-converter can always be kept at optimum.

Preferred embodiments of the present invention are listed in the respective dependent claims.

According to a preferred embodiment, said at least one switchable component for said pulse width modulation DC/DC-converter is selected from among the group of: a switchable oscillator having at least two switchable frequencies, a comparator having a switchable bias current source having at least two switchable comparator bias currents, an error amplifier having a switchable bias current source having at least two switchable error amplifier bias currents, and a switchable error amplifier reference voltage source having at least two switchable error amplifier reference voltages. These are the essential power determining components of a conventional DC/DC converter.

According to a further preferred embodiment, said internal electrical circuit is a baseband digital part and said internal logical control signal is derived from a control logic of said baseband digital part.

According to a further preferred embodiment, said first switching state corresponds to a low output power requirement and said second switching state corresponds to a high output power requirement of said internal electrical circuit.

According to a further preferred embodiment, said internal logical control signal is used to changeover from a first low power low, frequency clock source to a second high power, high frequency clock source for said internal electrical circuit. This signal indicates the changeover between the sleep and traffic modes and is usually generated by an internal counter circuit.

BRIEF DESCRIPTION OF THE DRAWINGS

The present invention will become more fully understood by the following detailed description of preferred embodiments thereof in conjunction with the accompanying drawings, in which:

FIG. 5 the load current of the baseband digital part 10 as a function of time for said mobile phone in the standby state;

FIG. 6 the efficiency loss of a typical DC/DC-converter as a function of the load current between 0 and 50 mA;

DESCRIPTION OF THE PREFERRED EMBODIMENTS

In the figures, the same reference signs denote the same or functionally equivalent elements.

Figure 8:
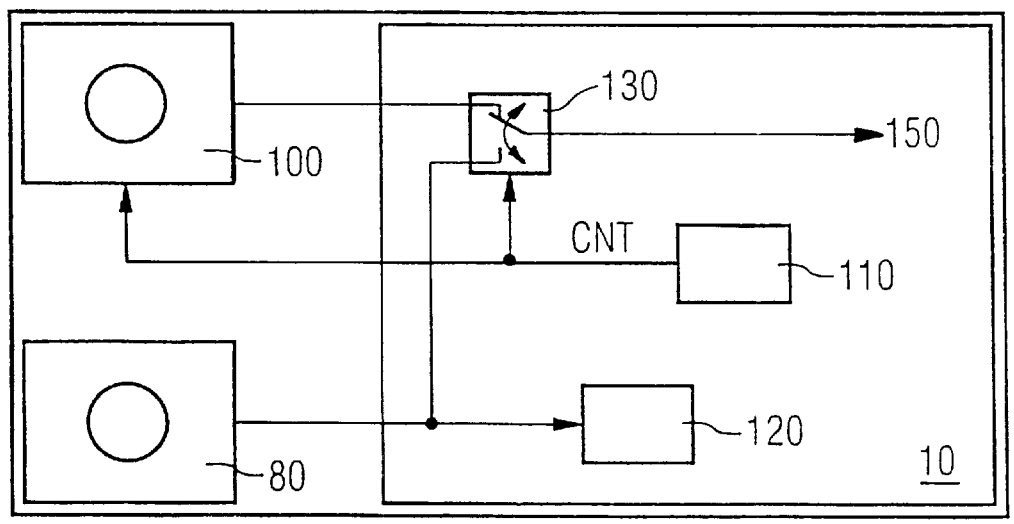
FIG. 8 an usual baseband digital part for a mobile phone adapted to employ a two clock source scheme.

FIG. 8 shows an usual baseband digital part for a mobile phone adapted to employ a two clock source scheme.

In FIG. 8, reference sign 80 denotes a 32,768 kHz oscillator and 100 is a 13 MHz oscillator.

The following components of the baseband digital part 10 are specifically denoted: a real time clock 120, a clock source switch 130, a control logic 110, a control signal CNT from the control logic 110, and the digital core 150.

The 13 MHz oscillator 100 is the main clock source and comprised of a high accuracy, high frequency oscillator. This main clock source is used whenever the mobile phone is in active or traffic mode, i.e. connected to the network, or when the software tasks require more processing power, i.e. MMI functions etc. In periods of low activity, the clock source is changed to the ultra low power, low frequency clock in form of the 32,768 kHz oscillator 80 in order to save power whose frequency is adapted to accommodate real clock functions.

The changeover of the clock source is controlled by the logical control signal CNT which enables/disables the 13 MHz oscillator 100 and simultaneously changes the switch position of the clock source switch 130. In other words, the 13 MHz oscillator 100 is only active in traffic mode periods, whereas the 32,768 kHz oscillator 80 is always kept turned on because of its ultra low power consumption.

Thus, said internal logical control signal CNT controls a first low output power requirement operation period and a second high of output power requirement operation period of said baseband digital part 10.

Figure 1:
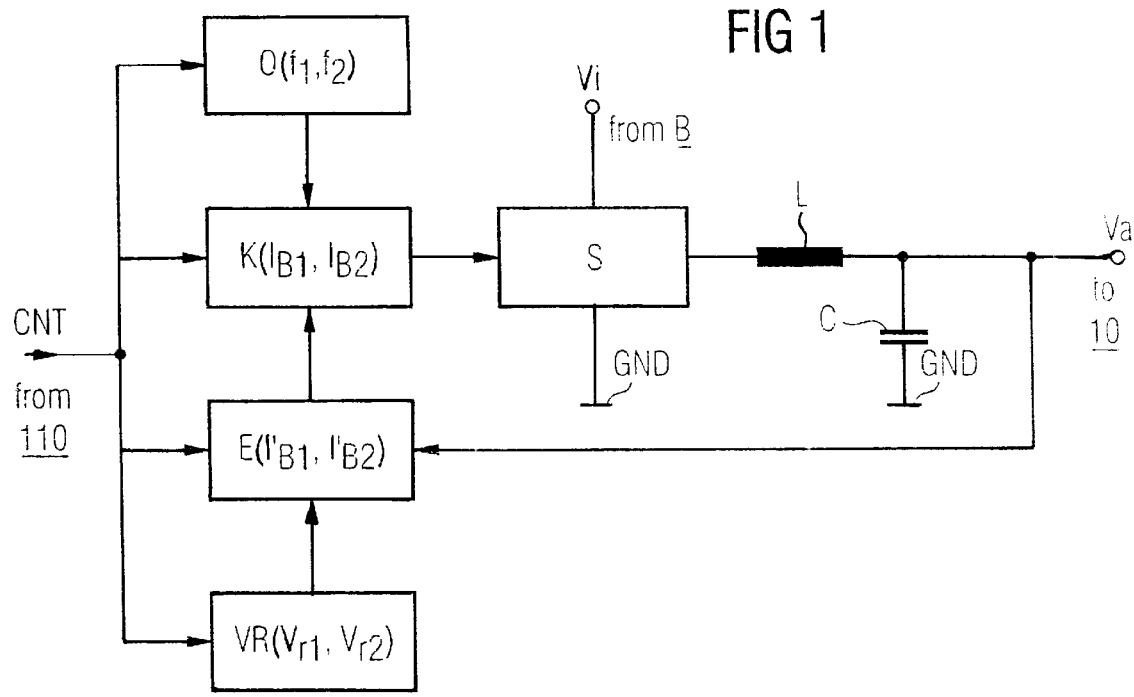
FIG. 1 a schematic diagram of a DC/DC-converter used in a first embodiment of the present invention.

FIG. 1 shows a schematic diagram of a DC/DC-converter used in a first embodiment of the present invention.

In FIG. 1, reference signal O denotes a switchable oscillator having a first and second frequency $f_1$, $f_2$, K a switchable comparator having a first and second bias current $I_{B1}$, $I_{B2}$, E a switchable error amplifier having a first and second bias current $I'_{B1}$, $I'_{B2}$, VR a switchable voltage reference having a first and second reference voltage $V_{r1}$, $V_{r2}$, S a switch, $V_i$ a battery supply voltage, $V_o$ an output voltage, L an inductance, C a capacitance, and GND ground or earth potential.

In this embodiment, the switching of said switchable components O, K, E, VR of the DC/DC converter is performed in accordance with said internal logical control signal CNT derived from the control logic 110. Thus, it is not necessary to react to a change in output power sensed at the output of the DC/DC-converter, but the change in required power can be anticipated by having the signal CNT.

Here, the switchable components O, K, E, VR have two switching states, a first switching state (index "1") corresponding to a first low output power requirement and a second switching state (index "2") corresponding to a second high output power requirement of said baseband digital part 10.

In the sleep mode, all switching states are, set to first switching state effecting low power consumption, and in the traffic mode, all switching states are set to second switching state effecting relatively high power consumption.

As becomes readily apparent to the average skilled person, low values of switching frequency, bias currents and reference voltage (determines output voltage) imply a low power consumption and vice versa high values of switching frequency, bias currents and reference voltage (determines output voltage) imply a high power consumption.

Thus, each of these parameters can be optimized for the respective operation mode.

Figure 2:
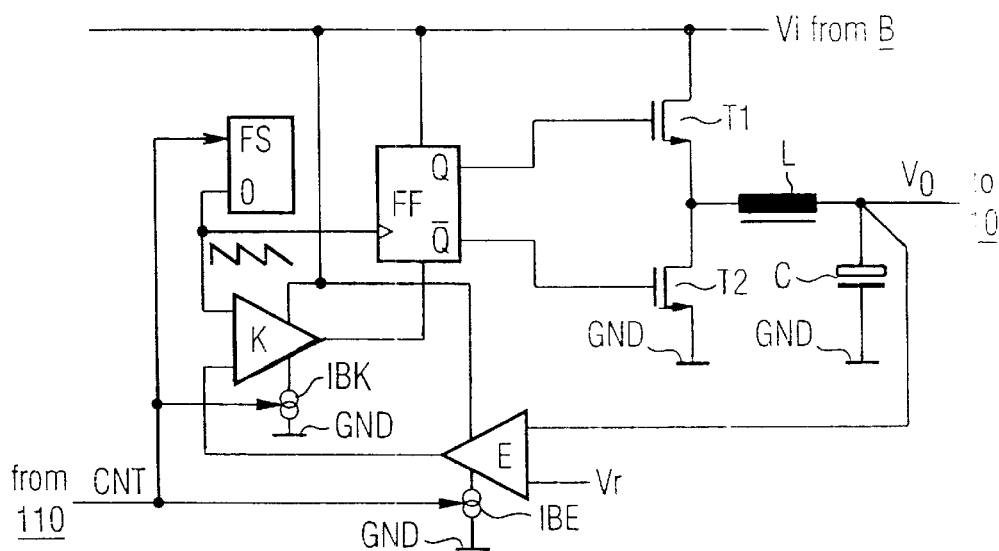
FIG. 2 a schematic diagram of a DC/DC-converter used in a second embodiment of the present invention.

FIG. 2 shows a schematic diagram of a DC/DC-converter used in a second embodiment of the present invention.

In FIG. 2, reference sign FS indicates a frequency select input, FF a PWM latch, IBK a bias current source for the comparator K, IBE a bias current source for the error amplifier E, T1 a top side switching transistor, T2 a synchronous transistor rectifier, and $V_r$ a reference voltage.

In comparison to FIG. 1, in the embodiment shown in FIG. 2 some more electrical circuit details will be explained.

Thus, the battery supply voltage $V_i$ typically amounts to 3–5.5 volts, whereas the output voltage $V_o$ typically amounts to 1.8 volts.

The switch S of FIG. 1 has been realized as the synchronizing latch and the two transistors T1, T2. No switching of the reference voltage determining the magnitude of the output voltage $V_o$ is provided in this example.

The control signal CNT provided by the control logic 110 which is used to power down the 13 Mhz frequency clock 100, is used to shift the frequency of the oscillator O of the DC/DC converter and to decrease the bias currents of the bias current sources IBK and IBE, respectively.

Figure 3:
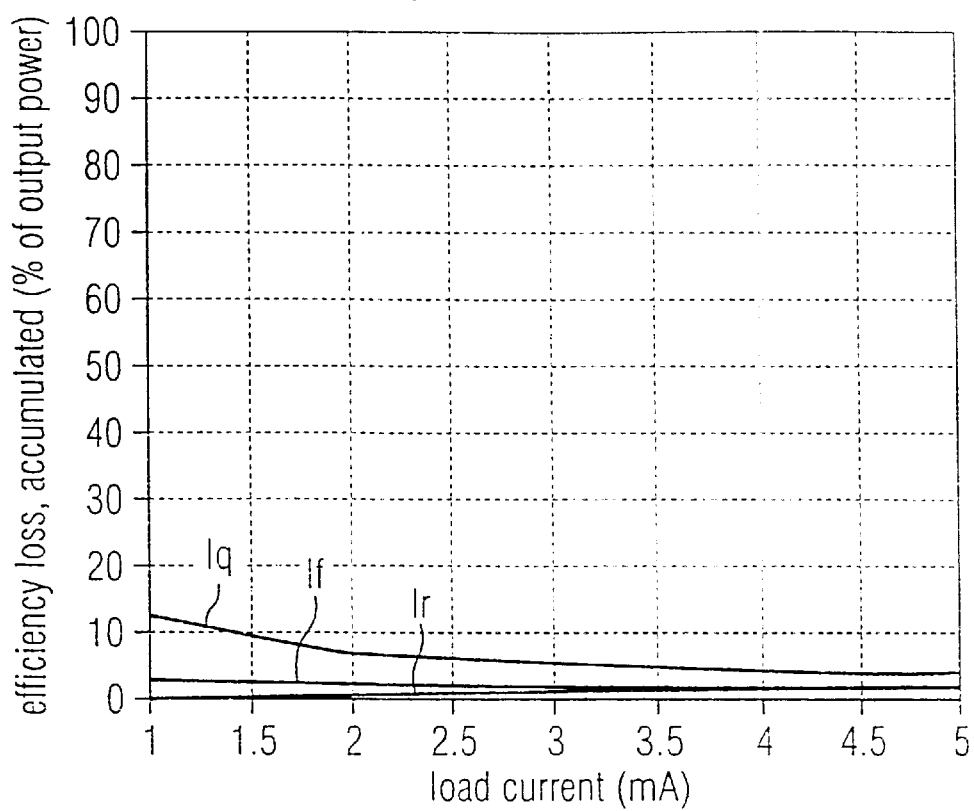
FIG. 3 the efficiency loss of the DC/DC-converter shown in FIG. 2 as a function of the load current between 1 and 5 mA.
Figure 4:
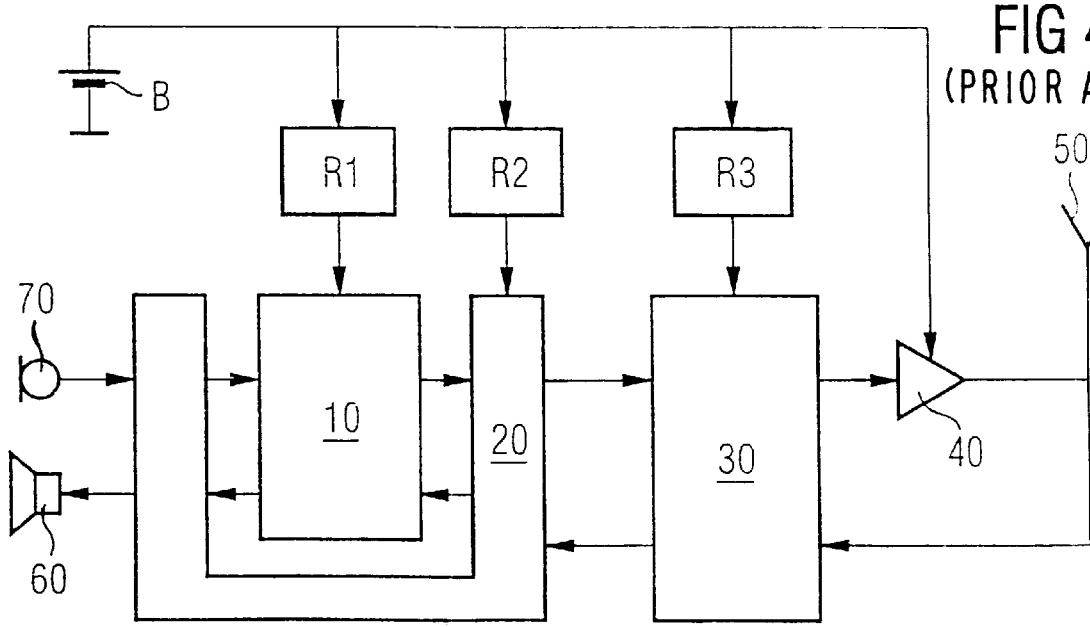
FIG. 4 a simplified block diagram of a usual mobile phone having a pulse width modulation DC/DC-converter for converting a battery supply voltage to an internal supply voltage of a baseband digital part.

FIG. 3 shows the efficiency loss of the DC/DC-converter shown in FIG. 2 as a function of the load current between 1 and 5 mA.

Figure 7:
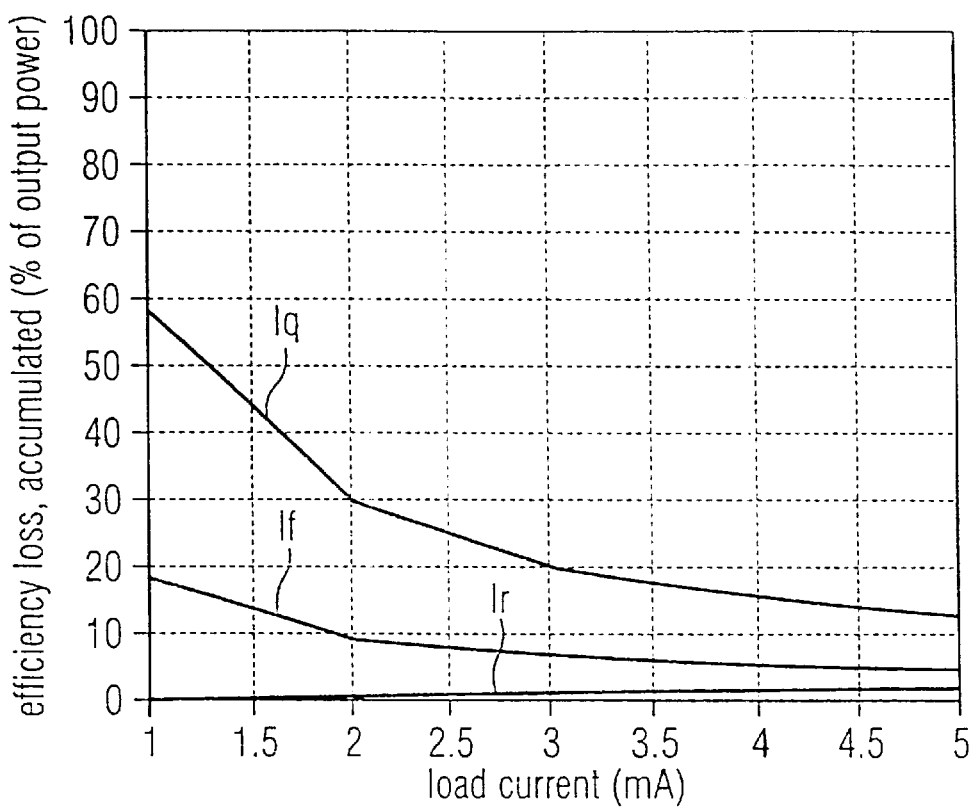
FIG. 7 the efficiency loss of a typical DC/DC-converter as a function of the load current between 1 and 5 mA.

The data shown in FIG. 3 were obtained by lowering the switching frequency of the oscillator O from 256 kHz in the active mode to 32 kHz in the sleep mode and decreasing the quiescent current of the comparator K and the error amplifier from 200 μA to 50 μA. The improvement becomes obvious from a comparison with FIG. 7 which shows the results of the conventional device using a single switching frequency and fixed quiescent currents.

Although the present invention has been described with respect to preferred embodiments thereof, it should be understood that many modifications can be performed without departing from the scope of the invention as defined by the appended claims.

Particularly, the switchable parameters of the DC/DC converter and the internal logical control signal can have more than two discrete values.

Moreover, not all of the four parameters mentioned in the above example have to be changed. For example, there may be applications where it is not permissible to alter the output voltage in the sleep mode. In more complicated designs of the DC/DC converter, there may be additional parameters to be switched.

Also, the control signal may be derived from another component within the mobile radio device, and not only from the baseband digital part.

I claim:

1. A method for controlling power consumption in a mobile radio device, said mobile radio device including a pulse width modulation DC/DC-converter for converting a battery (B) supply voltage ($V_i$) to an internal supply voltage ($V_o$)) for an internal electrical circuit (10) of said mobile radio device, said method comprising the steps of:
   a) providing at least one switchable component (O, K, E, VR) for said pulse width modulation DC/DC-converter, said least one switchable component (O, K, E, VR) having at least two switching states, a first switching state corresponding to a first output power requirement and a second switching state corresponding to a second output power requirement of said internal electrical circuit (10), wherein said first and second switching states correspond to a low pulse width modulation frequency for a low power requirement mode and a high pulse width modulation frequency for a high power requirement mode;
   b) deriving an internal logical control signal (CNT), said internal logical control signal (CNT) reflecting a first output power requirement operation period or a second output power requirement operation period of said internal electrical circuit (10); and
   c) switching said at least one switchable component (O, K, E, VR) in accordance with said derived internal logical control signal (CNT).

2. The method as defined in claim 1, wherein said at least one switchable component (O, K, E, VR) for said pulse width modulation DC/DC-converter is a switchable oscillator (O) having at least two switchable frequencies ($f_1$, $f_2$), or a comparator (K) having a switchable bias current source having at least two switchable comparator bias currents ($I_{B1}$, $I_{B2}$), or an error amplifier (E) having a switchable bias current source having at least two switchable error amplifier bias currents ($I'_{B1}$, $I'_{B2}$), or a switchable error amplifier reference voltage source (VR) having at least two switchable error amplifier reference voltages ($V_{r1}$, $V_{r2}$).

3. The method as defined, in claim 1, wherein said internal electrical circuit (10) is a baseband digital part and said internal logical control signal (CNT) is generated by a control logic (110) of said baseband digital part.

4. The method as defined in claim 1, wherein said first switching state corresponds to a low output power requirement and said second switching state corresponds to a high output power requirement of said internal electrical circuit (10).

5. The method as defined in claim 1, wherein said internal logical control signal (CNT) signals a changeover from a first low power, low frequency clock source (80) to a second high power, high frequency clock source (100) for said internal electrical circuit (10).

6. The method as defined in claim 1, wherein said mobile radio device is a mobile phone.

7. A device for controlling power consumption in a mobile radio device, said mobile radio device having a pulse width modulation DC/DC-converter for converting a battery supply voltage to an internal supply voltage for an internal electrical circuit of said mobile radio device, said device comprising:
   at least one switchable component (O, K, E, VR) for said pulse width modulation DC/DC-converter, said least one switchable component (O, K, E, VR) having at least two switching states, a first switching state corresponding to a first output power requirement and a second switching state corresponding to a second output power requirement of said internal electrical circuit (10), wherein said first and second switching states correspond to a low pulse width modulation frequency for a low power requirement mode and a high pulse width modulation frequency for a high power requirement mode;
   means for deriving an internal logical control signal (CNT), said internal logical control signal (CNT) reflecting a first output power requirement operation period or a second output power requirement operation period of said internal electrical circuit (10); and
   switching means for switching said at least one switchable component (O, K, E, VR) in accordance with said derived internal logical control signal (CNT).

8. The device as defined in claim 7, wherein said at least one switchable component (O, K, E, VR) for said pulse width modulation DC/DC-converter is a switchable oscillator (O) having at least two switchable frequencies ($f_1$, $f_2$), or a comparator (K) having a switchable bias current source having at least two switchable comparator bias currents ($I_{B1}$, $I_{B2}$), or an error amplifier (E) having a switchable bias current source having at least two switchable error amplifier bias currents ($I'_{B1}$, $I'_{B2}$), or a switchable error amplifier reference voltage source (VR) having at least two switchable error amplifier reference voltages ($V_{r1}$, $V_{r2}$).

9. The device as defined in claim 7, wherein said internal electrical circuit (10) is a baseband digital part including a control logic (110) and said internal logical control signal (CNT) is generated by said control logic (110) of said baseband digital part.

10. The device as defined in claim 7, wherein said first switching state corresponds to a low output power requirement and said second switching state corresponds to a high output power requirement of said internal electrical circuit (10).

11. The device as defined in claim 7, further comprising means for changing over from a first low power low, frequency clock source (80) to a second high power, high frequency clock source (100) for said internal electrical circuit (10) in accordance with said internal logical control signal (CNT).

12. The device as defined in claim 7, wherein said mobile radio device is a mobile phone.

* * * * *